United States Patent
Kumakiri

(10) Patent No.: US 6,219,759 B1
(45) Date of Patent: Apr. 17, 2001

(54) CACHE MEMORY SYSTEM

(75) Inventor: Kazuo Kumakiri, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/187,486

(22) Filed: Nov. 6, 1998

(30) Foreign Application Priority Data

Nov. 7, 1997 (JP) .................................................. 9-322068

(51) Int. Cl.[7] .................................................. G06F 12/08
(52) U.S. Cl. ........................... 711/137; 711/127; 710/23; 710/27; 710/39
(58) Field of Search ................................. 711/118, 137, 711/127; 710/39, 23, 27

(56) References Cited

U.S. PATENT DOCUMENTS

| | | | |
|---|---|---|---|
| 5,276,852 | * 1/1994 | Callander et al. | 710/129 |
| 5,499,353 | * 3/1996 | Kadlec et al. | 711/118 |
| 5,802,569 | * 9/1998 | Genduso et al. | 711/137 |
| 5,822,616 | * 10/1998 | Hirooka | 710/22 |
| 6,006,317 | * 12/1999 | Ramagopal et al. | 712/23 |
| 6,012,106 | * 1/2000 | Schumann et al. | 710/22 |

FOREIGN PATENT DOCUMENTS

| | | |
|---|---|---|
| 4-190438 | 7/1992 | (JP) . |
| WO 96/12229 | 4/1996 | (WO) . |

OTHER PUBLICATIONS

"Computer Configuration and Design", (Nikkei BP), (4/96), pp 416–423.

* cited by examiner

Primary Examiner—Hiep T. Nguyen
(74) Attorney, Agent, or Firm—Foley & Lardner

(57) ABSTRACT

The present invention provides a cache memory system which allows a user to update cache memory in advance without adding special hardware. The cache memory system comprises cache memory composed of a plurality of banks, a cache controller which issues an update instruction as directed by a command, and a DMA controller which transfers data. The cache controller has a command register in which a cache update instruction from a central processing unit is stored. When a cache miss occurs or when the cache controller detects that data was written into the command register, the cache controller issues a DMA transfer instruction to the DMA controller.

15 Claims, 3 Drawing Sheets

FIG. 2

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| | START ADDRESS | | | | | | | | | | | NUMBER OF BLOCKS | | | |

COMMAND REGISTER

CACHE MEMORY SYSTEM

BACKGROUND OF THE INVENTION

1. Field of the Invention

The present invention relates to a cache memory system.

2. Description of the Related Art

As the microprocessor increases its speed, hierarchically-structured cache memory has become popular to speed up access to memory. When data to be accessed is not in the cache memory of a cache memory system, an attempt to get data from cache memory results in a miss hit and data is transferred from main memory to cache memory. Therefore, when desired data is not in cache memory, the processor must suspend its processing until the transfer of data from main memory to cache memory is finished, decreasing the processing capacity.

To increase the cache memory it ratio, various methods have been proposed. For example, Japanese Patent Publication Kokai JP-A No. Hei 4-190438 discloses a method in which a program execution flow is read ahead to bring data, which will be used at branch addresses, into cache memory in advance.

FIG. 3 is a block diagram showing the configuration of conventional cache memory. As shown in FIG. 3, a central processing unit CPU 301 is connected to cache memory CM 303 and to a cache controller CMC 304 via an address bus 311 and a data bus 321. A sub-processing unit SPU 302 is connected to the cache controller CMC 304 via an address bus 312 and the data bus 321, and to the cache memory CM 303 via the data bus 321. The sub-processing unit 302 monitors instructions to be sent to the central processing unit CPU 301 via the data bus 321. Upon detecting a cache update instruction the compiler automatically inserted before a jump instruction, the sub-processing unit 302 tells the cache controller CMC 304 to update cache memory. The cache controller CMC 304 itself does not update cache memory; instead, the cache controller CMC 304 passes update address information to a DMA controller 305 and causes it to start transferring data from main memory 306 to a location in cache memory 303 indicated by the address information. This cache update instruction, meaningless to the central processing unit CPU 301, is ignored. After that, when control is passed to the jump instruction, no hit miss occurs because data has already been sent from main memory 306 to cache memory CM 303.

Another proposed method is that the sub-processing unit SPU 302 fetches an instruction which is several instructions ahead of the current instruction to find a miss hit in advance and to cause the cache controller CMC 304 to update cache memory.

A general mechanism of cache memory is described for example, in "Computer Configuration and Design" (Nikkei BP).

However, the prior art described above has the following problems.

The first problem is that the system according to the prior art requires hardware specifically designed to monitor programs, resulting in a large-sized circuit.

The second problem is that reading an instruction that is several instructions ahead of the current instruction requires the memory to have two or more ports. Normally, memory with two or more ports is large.

The third problem is that, because the update instruction is inserted automatically by a compiler into a location that is several instructions ahead of the current instruction, the cache memory update start time cannot be set freely. Therefore, even when it is found that it takes longer to update cache memory because of an increase in the cache memory block size or in the main memory access time, cache memory updating cannot be started at an earlier time. This sometimes results in cache memory updating not being completed within a predetermined period of time.

The fourth problem is that the method of automatically inserting a jump instruction, through the use of a compiler, into a location several instructions ahead of the current instruction requires the compiler to have that function built-in, increasing the development cost of development tools such as a compiler.

SUMMARY OF THE INVENTION

The present invention seeks to solve the problems associated with the prior art described above. It is an object of the present invention to provide a cache memory system which is based on the configuration of the configured main memory or cache memory and which updates cache memory efficiently without an additional compiler function or without a special device for monitoring instructions.

To achieve the above object, the present invention provides a cache memory system comprising a memory composed of a plurality of banks, a cache controller sending a cache update instruction to a Direct Memory Access DMA controller as directed by a central processing unit, and the DMA controller which transfers data from main memory to cache memory according to the instruction received from said cache controller.

BRIEF DESCRIPTION OF THE DRAWINGS

FIG. 2 is a diagram showing an example of the configuration of a command register used in the embodiment of the present invention.

DETAILED DESCRIPTION OF THE PREFERRED EMBODIMENTS

Figure 1:
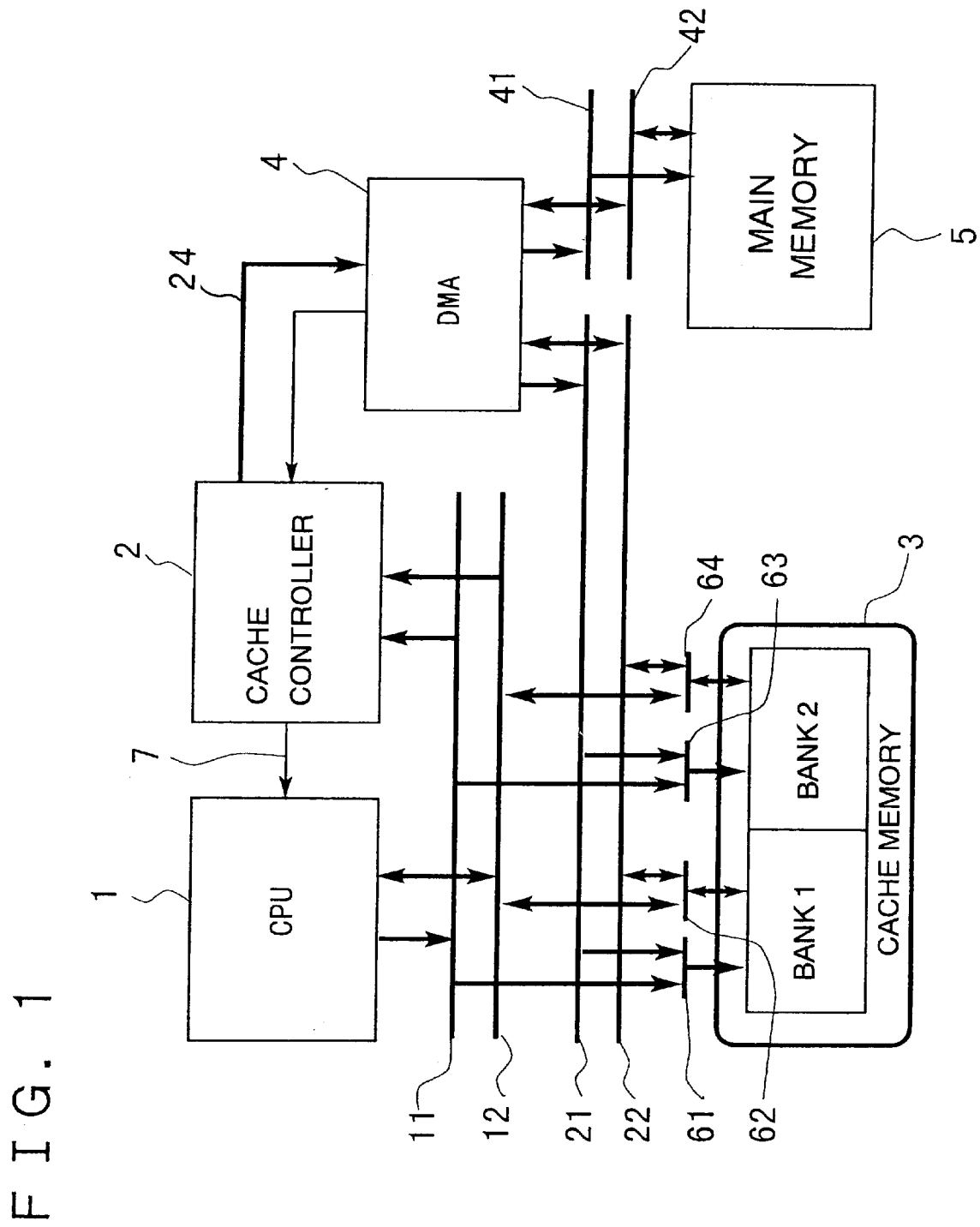
FIG. 1 is a block diagram showing the configuration of an embodiment of the present invention.
Figure 3:
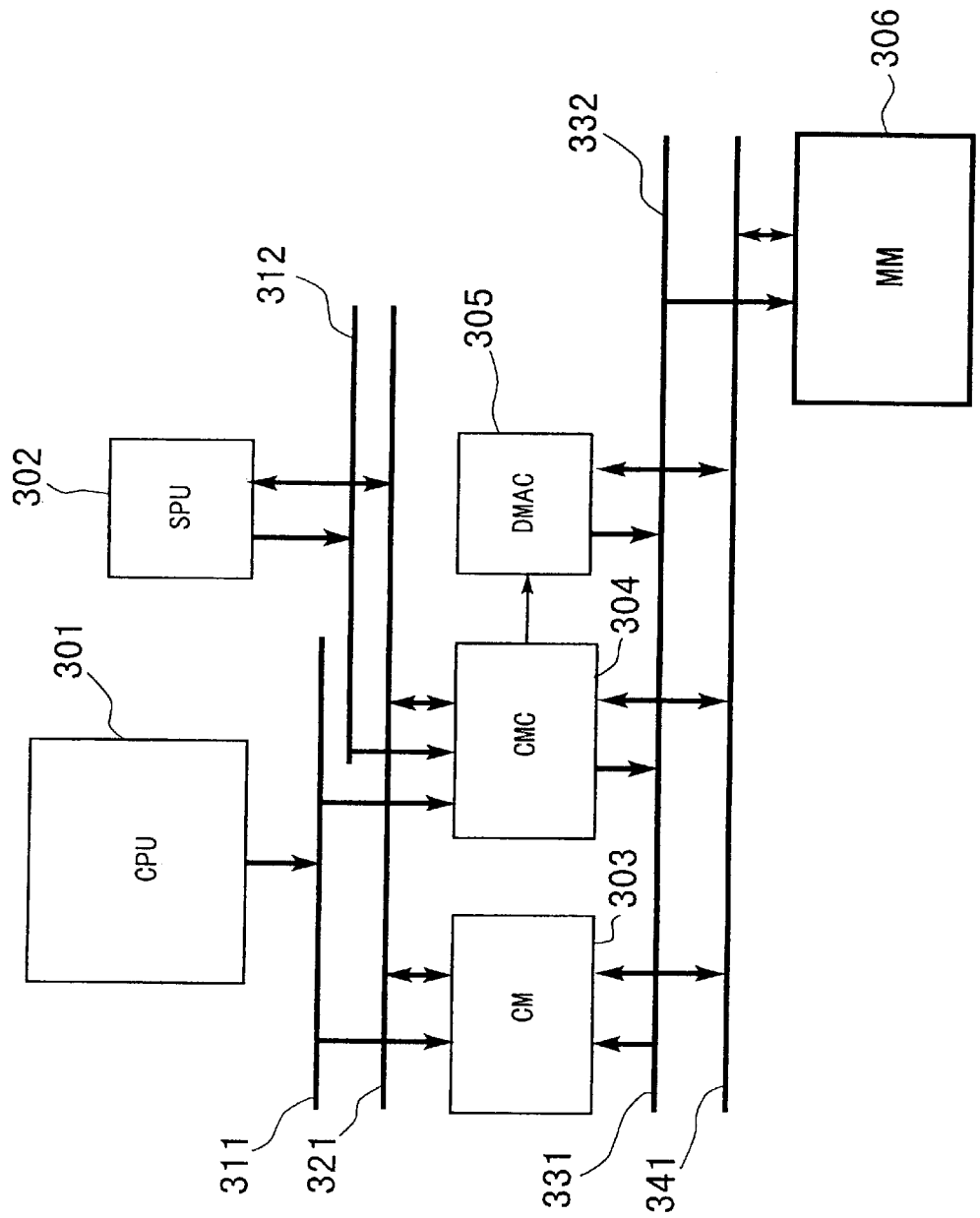
FIG. 3 is a block diagram showing a cache memory system according to the prior art.

A preferred embodiment of the present invention will be described in detail. In the preferred embodiment, a cache memory system according to the present invention comprises cache memory (3 in FIG. 1) which is composed of a plurality of banks and a cache controller (2 in FIG. 1) which sends a cache update instruction to a Direct Memory Access (DMA) controller (4 in FIG. 1) as directed by a central processing unit 1. The DMA controller 4 transfers data between a main memory (5 in FIG. 1) and the cache memory (3 in FIG. 1) in the DMA mode.

In the preferred embodiment, the cache memory system according to the present invention is composed of a plurality of banks which may be accessed from different resources at the same time.

In the preferred embodiment, provided the central processing unit 1 is not using a memory bank to be updated, the cache memory system according to the present invention allows data to be transferred between the memory bank and the main memory concurrently with the processing of the central processing unit 1 without stopping the processing of the central processing unit 1.

In the preferred embodiment, when the central processing unit CPU 1 is using a memory bank to be updated, the cache memory system according to the present invention coordinates access to the cache memory, i.e., coordinating access to the banks so as to allow the other bank (or any of other remaining banks) to be accessed.

The embodiment of the present invention will now be described more in denial by way of an example with reference to the drawings.

FIG. 1 is a diagram showing the configuration of the example of the present invention. Referring to FIG. 1, a microprocessor used in the example of the present invention comprises a central processing unit (CPU) 1, cache memory 3 connected to the central processing unit 1 via an address bus 11 and a data bus 12, a cache controller 2, a DMA controller 4, and main memory 5.

The cache memory 3 is connected to the DMA controller 4 via a DMA address bus 21 and a DMA data bus 22. In addition, signal line 24 activating the DMA controller 4 is sent from the cache controller 2 to the DMA controller 4.

The DMA controller 4 is connected to main memory 5 via an external address bus 41 and an external data bus 42. A processing-stopping signal line 7 is connected from the cache controller 2 to the central processing unit 1.

The cache controller 2 divides the cache memory 3 into a plurality of blocks, each composed of a number of words that are updated at a time. For use in block management, tag memory (not shown) is provided for managing the blocks.

The tag memory contains a predetermined number of bits of the address of each of a block storing the contents in the cache memory 3. When an address is sent from the central processing unit 1, the tag portion of the address is stored in the tag memory to allow the corresponding block storing the contents in the cache memory 3 to be identified.

The cache controller 2 also has a command register into which a cache update instruction from the central processing unit 1 is stored. When it is detected that a cache miss occurs or that data is written into the command register, a DMA transfer instruction is issued to the DMA controller 4.

The cache memory 3, composed of a plurality of banks, is faster in speed than the main memory 5. Multiplexers 61, 62, 63, and 64 are connected to the cache memory 3 to allow each bank to select a device to or from which data is sent. The number of banks is not limited to two although only two banks are shown in FIG. 1.

The DMA controller 4 starts operation upon receiving an instruction from the cache controller 2. At this time, the DMA controller 4 receives information on source data (the start address of the source data in the main memory 5 and the number of words of the source data) and information on a destination location (the start address of the destination location in the cache memory 3 to which the data is to be sent).

The DMA controller 4 sends data directly to the cache memory 3, not via the central processing unit 1 or the cache controller 2.

FIG. 2 shows an example of the command register in the cache controller 2. As shown in FIG. 2, the command register is composed of a cache update start address field and a number-of-blocks field.

The operation of this example is described below.

Referring to FIG. 1, when the central processing unit 1 reads data, it sends an address to the cache controller 2 and the cache memory 3 via the address bus 11.

The cache controller 2 gets a portion of the address from the central processing unit 1 and references the tag memory to determine whether desired data is in the cache memory 3.

When desired data is found, the central processing unit 1 reads it from the cache memory 3. On the other hand, when desired data is not in the cache memory 3, the cache controller 2 stops the processing of the central processing unit 1, updates the tag memory, sends cache memory update information (the start address of the block containing desired data, the number of words to be transferred, and the start address in cache memory at which data is to be sent) to the DMA controller 4, and tells it to update the cache memory 3.

Upon receiving the instructions from the cache controller 2, the DMA controller 4 transfers data from the main memory 5 to the cache memory 3.

When the transfer of the block containing desired data is completed, the cache controller 2 resumes the processing of the central processing unit 1.

In order to update the cache memory 3 in advance, the central processing unit 1 executes a command data transfer instruction. This instruction, a user-coded instruction embedded among other instructions, sends command data to the command register which is mapped into memory from the cache controller 2.

The cache controller 2 generates the block start address from the start address data in the command register; it also generates the number of transfer words from the number-of-blocks data in the command register. Then, as in the usual cache-fill operation, the cache controller 2 sends to the DMA controller 4 the start address of the block to be loaded and the number of words to be transferred as well as the start address of the corresponding block within the cache memory to which data is to be sent. When the DMA controller 4 transfers data, the cache memory 3 is updated. At this time, the multiplexers 63 and 64, which have been connected to the central processing unit 1, are turned to connect to the DMA controller 4 to receive data for the bank in the cache memory 3 to which data is to be sent.

In addition, based on the update instruction, the cache controller 2 changes the content of the internal tag memory to the tag corresponding to the block to be updated. This transfer, which is performed between the cache controller 2 and the DMA controller 4, does not affect the central processing unit 1.

If the bank in the cache memory 3 to which data is to be transferred is not being used by the central processing unit 1, the transfer may be done concurrently with processing of the central processing unit 1, whereupon the central processing unit 1 need not be stopped. However, if the bank in the cache memory 3 to be updated is being used by the central processing unit 1, access from the central processing unit 1 and from the DMA controller 4 must be coordinated.

Access coordination is done, for example, by keeping the processing-stop signal to the central processing unit 1 asserted until the cache memory is updated. This method ensures that the program will be completed without failure although the central processing unit 1 may be placed in the stopped state for a prolonged time depending upon the time at which the update instruction is issued.

Another coordination method prevents the DMA controller 4 from accessing the cache memory until the central processing unit 1 ends processing.

The cache system according to the present invention has the following advantages.

The first advantage of the present invention is that the cache system does not require a special device for monitoring programs, reducing the size of the circuit.

The second advantage of the present invention is that the cache system prevents the hardware size from increasing. This is because the cache system does not use memory with two or more ports.

The third advantage of the present invention is that the update start time of cache memory may be set freely.

This is because the user may specify a data transfer instruction in the command register any time he or she wants in order to update cache memory. Therefore, when the cache memory bank size increases or when the main memory access time is changed, the command data transfer instruction may be specified early enough for cache memory updating to be completed.

The fourth advantage of the present invention is that the cache system does not require an additional compiler and therefore does not require additional development costs.

It should be noted that modification obvious in the art may be done without departing the gist and scope of the present invention as disclosed herein and claimed hereinbelow as appended.

What is claimed is:

1. A cache memory system comprising:
    a cache memory composed of a plurality of banks; and
    a cache controller sending a cache update instruction to a Direct Memory Access DMA controller as directed by a central processing unit CPU,
    wherein said DMA controller transfers data between main memory and said cache memory according to the instruction received from said cache controller,
    wherein said cache controller has a command register in while the cache update instruction from said central processing unit is stored and wherein a DMA transfer instruction is issued to said DMA controller when a cache miss occurs or when said cache controller detects that data has been written into said command register.

2. The cache memory system as defined by claim 1 wherein said plurality of banks of the memory may be accessed concurrently by different resources.

3. The cache memory system as defined by claim 1 wherein, when one of said plurality of banks to be updated is not being used by the central processing unit CPU, data may be transferred between said cache memory and said main memory without stopping processing of said central processing unit.

4. The cache memory system as defined by claim 1 wherein, when one of said plurality of banks to be updated is being used by the central processing unit CPU, the memory is so constructed as to coordinate access to the banks between said central processing unit and said DMA controller.

5. The cache memory system as defined by claim 1 wherein said DMA controller is connected via a DMA address bus and a DMA data bus to the banks of said memory.

6. The cache memory system as defined by claim 1 wherein said CPU is connected via an address bus and a data bus to the cache controller, via which said CPU is further connected with the banks of said memory, and wherein said DMA controller is connected to said main memory via an access bus and a data bus.

7. The cache memory system as defined by claim 5 wherein multiplexers are disposed to the banks of said memory interposed between the banks and the DMA address bus and the DMA data bus to allow each bank to select a device to or from which data is sent.

8. The cache memory system as recited in claim 1 wherein said data written into said command register includes a user-coded command data transfer instruction.

9. A cache memory system comprising:
    a cache memory composed of a plurality of banks; and
    a cache controller sending a cache update instruction to a Direct Memory Access DMA controller as directed by a central processing unit CPU,
    wherein said DMA controller transfers data between main memory and said cache memory according to the instruction received from said cache controller, and
    wherein said cache controller has a command register and wherein, when said central processing unit CPU executes a command transfer instruction for said command register in said cache controller, said cache controller issues a DMA transfer start instruction to said DMA controller, based on start address data and number-of-transfer-blocks data stored in said command register, to cause said DMA controller to transfer data between the main memory and the cache memory according to the command transfer instruction from said cache controller.

10. The cache memory system as defined by claim 9 wherein said plurality of banks of the memory may be accessed concurrently by different resources.

11. The cache memory system as defined by claim 9 wherein, when one of said plurality of banks to be updated is not being used by the central processing unit CPU, data may be transferred between said cache memory and said main memory without stopping processing of said central processing unit.

12. The cache memory system as defined by claim 9 wherein, when one of said plurality of banks to be updated is being used by the central processing unit CPU, the memory is so constructed as to coordinate access to the banks between said central processing unit and said DMA controller.

13. The cache memory system as defined by claim 9 wherein said DMA controller is connected via a DMA address bus and a DMA data bus to the banks of said memory.

14. The cache memory system as defined by claim 9 wherein said CPU is connected via an address bus and a data bus to the cache controller, via which said CPU is further connected with the banks of said memory, and wherein said DMA controller is connected to said main memory via an access bus and data bus.

15. The cache memory system as defined by claim 13 wherein multiplexers are disposed to the banks of said memory interposed between the banks and the DMA address bus and the DMA data bus to allow each bank to select a device to or from which data is sent.

* * * * *